March 26, 1957

G. P. MALY 2,786,530

WELL PLUGGING PROCESS

Filed March 11, 1955

INVENTOR
GEORGE P. MALY
BY
Richard C. Hartman
ATTORNEY.

United States Patent Office 2,786,530
Patented Mar. 26, 1957

2,786,530
WELL PLUGGING PROCESS

George P. Maly, Fullerton, Calif., assignor to Union Oil Company of California, Los Angeles, Calif., a corporation of California Application March 11, 1955, Serial No. 493,792

17 Claims. (Cl. 166—10)

This invention relates to an improved process for plugging subterranean formations or strata penetrated by well bores, and in particular concerns a plugging process especially adapted for use during secondary recovery operations involving plural wells.

Among the various methods presently employed for recovering petroleum from oil-bearing sands which have become depleted to the point that the oil no longer flows naturally into wells penetrating such sands, the secondary recovery method known as "water-flooding" or "gas-driving" probably enjoys widest exploitation. In brief, such method consists simply in pumping a liquid or gaseous fluid such as water, air or natural gas into one or more intake wells under pressure sufficient to cause the fluid to flow out through the porous oil-bearing sands, thereby forcing the residual oil contained therein towards one or more producing wells from which it may be pumped to the earth's surface. In many instances, however, this method proves ineffective by reason of the occurrence of strata of high permeability extending between the intake and producing wells. The driving medium chooses the path of least resistance, i. e., the strata of highest permeability, and hence travels from the intake wells to the production wells in more or less well-defined channels and fails to sweep the residual oil from the formation as a whole. To overcome this difficulty it has been proposed to plug or drain the highly permeable, or "thief" strata so that the driving medium will be forced to take paths through the less permeable strata and force the residual oil therefrom into the production wells. In general, such plugs are formed by forcing into the thief strata a liquid composition which will solidify therein to form a substantially impermeable plug under the influence of heat and/or catalysts or by chemical reaction between its components. Polymerizable and self-condensing compositions such as styrene and phenol-aldehyde mixtures have been employed as plugging agents in this manner. However, such method of plugging the thief strata is often ineffective since the plug so formed usually extends within the thief strata for only a short distance back from the intake well, and upon resuming the driving operation the driving fluid soon by-passes the plug and again travels to the production wells substantially only through the thief strata.

Figure 1:
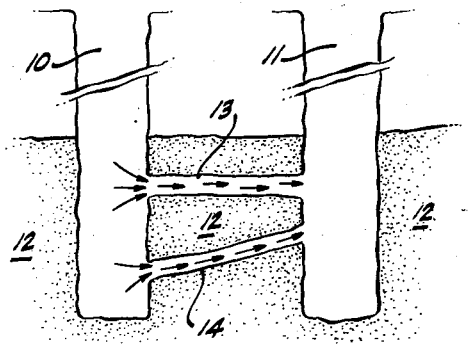
Figure 2:
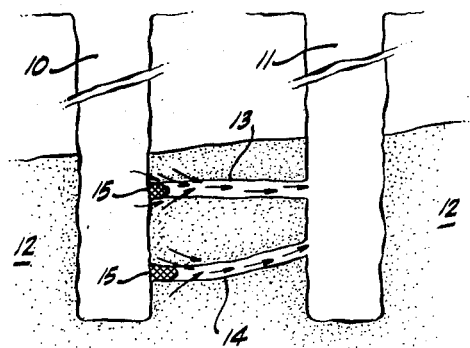

The difficulty described above is illustrated by Figures 1 and 2 of the accompanying drawing which forms a part of this application. Figure 1 diagrammatically shows intake and production wells 10 and 11, respectively, penetrating a depleted oil-bearing formation 12. Thief strata 13 and 14 (exaggerated in size) extend between the two wells. When a driving fluid such as water is introduced into the intake well under pressure, its direction of travel to the production well is as indicated by the arrows, i. e., it is substantially entirely through the thief strata. In Figure 2, the thief strata are shown plugged at 15 as achieved by prior art plugging methods. The plugs extend within the thief strata for only a relatively short distance, and the flow of driving medium towards the production well, as indicated by the arrows, simply by-passes such short plugs and is again substantially entirely via the thief strata.

It is accordingly an object of the present invention to provide an improved method for plugging subterranean strata of high permeability which extend from one well to another.

Another object is to provide a method for placing in high permeability strata of subterranean formations substantially impermeable plugs which are not readily by-passed by driving fluids which are subsequently forced through such formations.

A further object is to provide a method for plugging subterranean high permeability strata throughout a substantial portion of their length.

Other and related objects will be apparent from the following detailed description of the invention, and various advantages not specifically referred to herein will be apparent to those skilled in the art upon employment of the invention in practice.

I have now found that the above objects and related advantages may be achieved by introducing the components of the plugging composition into the opposite ends of the strata to be plugged so that such components meet and become admixed within such strata at a point somewhere along the length thereof and relatively far from the ends thereof. More particularly, I have found that the aforementioned by-passing of a plug positioned within a highly permeable stratum can be minimized by locating a relatively long plug at a point relatively far removed from the opposite ends of such stratum where they are connected to well bores. I have further found that such positioning can be achieved by employing a plugging composition essentially comprising two liquid components which upon contact or admixture form a solid of low permeability, and by introducing said components into the stratum at the opposite ends thereof through separate well bores connected therewith. Thus, where subterranean strata of high permeability are penetrated by intake and producing wells such strata can very advantageously be plugged by introducing into the intake well and thence into the strata a first liquid which is capable of reacting with, or under the influence of, a second liquid to form a substantially impermeable solid, and simultaneously or subsequently introducing into the producing well and thence into the opposite end of said strata sufficient of said second liquid to react with the first liquid and form said impermeable solid. The two liquids are thus introduced into the opposite ends of each stratum and meet and overlap at some point along the length thereof where they react to form a solid plug. By following such mode of procedure the strata are plugged by solid bodies which extend for a substantial distance along the length of the strata and which are located a considerable distance back from the well bores which penetrate the strata. By-passing of the plugs by a driving fluid is minimized by reason of their relatively great length, and in fact since such plugs are located relatively deep within the formation they actually tend to direct the driving fluid out of the high permeability channels and into the low permeability oil-bearing sands where it is most effective.

Figure 3:
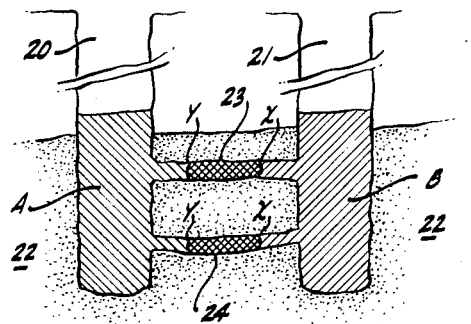
Figure 4:
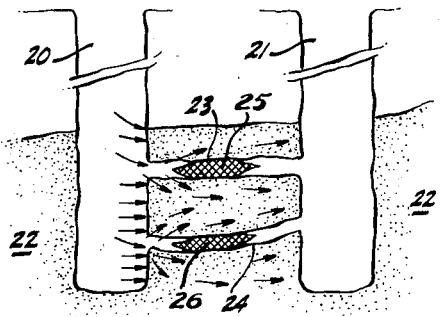

The principle of the invention is further illustrated by Figures 3 and 4 of the aforesaid drawing. In Figure 3, intake and production wells 20 and 21, respectively, are shown penetrating a depleted oil-bearing formation 22. High permeability thief strata 23 and 24 (exaggerated in size) extend between the two wells. In accordance with the process of the invention, a first liquid A is introduced into well 20 under sufficient pressure to force it out into strata 23 and 24. When liquid A has penetrated deeply into the strata, for example to point X, the pressure thereon is reduced and simultaneously or subsequently, a second liquid B is introduced into well 21 and similarly forced into strata 23 and 24, for example to point Y. Since strata 23 and 24 are highly permeable, as compared to the rest of formation 22, the flow of the liquids into and through formation 22 is substantially restricted to strata 23 and 24, and there is little tendency for the liquids to flow into the oil-bearing sands of formation 22 and form a plug therein. Within strata 23 and 24, the two liquids admix between points X and Y. As previously explained, and as discussed in detail below, the two liquids are of such nature that upon contact or admixture they form a relatively impermeable solid. Such solid will thus form between points X and Y and constitute an impermeable plug extending throughout an appreciable portion of each of strata 23 and 24. Upon completion of the formation of the plug, the unreacted liquids are withdrawn and the driving operation resumed.

Figure 4 represents the condition which prevails upon completion of the process of the invention, with plugs 25 and 26 occupying strata 23 and 24, respectively. The arrows show the path of flow of a driving fluid which is introduced into intake well 20 and forced through formation 22 towards production well 21.

As will be apparent to those skilled in the art, the plug which is ultimately formed with the strata may be any substantially impermeable solid which is insoluble in the fluid driving medium and which is formed by the interaction of two liquids at the temperature and pressure conditions prevailing within the formation being treated. Such solid may be formed by a catalyzed polymerization reaction, with the monomer being introduced into one well and the catalyst into the other. Thus, the liquid monomer of a polymerizable vinyl compound, e. g., styrene, and a liquid polymerization catalyst, e. g., a solution of t-butyl peroxide, may be introduced into opposite ends of a permeable stratum as above described so that at the point deep within the stratum where the two liquids meet polymerization will take place to form a solid polymer plug which will extend for a considerable distance along the length of the stratum. In order to insure the formation of as large an amount of solid polymer as possible, it is preferable that the polymer be soluble in the monomer so that maximum amounts of the monomer and the catalyst become admixed within the strata before complete solidification takes place. Styrene and the acrylate esters are examples of materials of this nature. The same desirable effect can be attained through the use of slow-acting catalysts. If desired, the liquid monomer may contain a polymerization inhibitor to prevent the occurrence of polymerization before it contacts the catalyst.

The solid plugging agent may also be formed by precipitation or coagulation. For example, the first liquid may comprise a solution of cellulose or a cellulose derivative, and the second may comprise a precipitant or coagulant. Upon admixture of the two liquids within the strata being treated there is formed a plug of cellulose or the cellulose derivative. Synthetic resins, e. g., polystyrene, polyvinyl chloride, ureaformaldehyde, glycol-maleic anhydride, etc. may similarly be precipitated from solutions thereof with suitable anti-solvents in accordance with the invention.

The plugging agent may also be one which is formed within the strata by chemical reaction between two liquids which have been injected therein as herein described. For example, the first liquid may comprise a phenol and the second may comprise an aldehyde and a suitable condensation catalyst so that the plug takes the form of a solid phenol-aldehyde resin produced within the strata by reaction between the phenol and aldehyde under the influence of the catalyst. Alternatively, the first liquid may comprise a mixture of a phenol and an aldehyde and the second may comprise the condensation catalyst. The plug may also be a heavy metal salt or soap formed within the strata by reaction between an aqueous soap or salt solution and an aqueous heavy metal salt. Thus, an aqueous solution of a sodium soap of a fatty or resin acid or mixture of fatty and/or resin acids may be employed as the first liquid and an aqueous solution of an iron or aluminum salt may be employed as the second liquid in accordance with the invention to form within the strata a plug of water-insoluble iron or aluminum soap or salt. Similarly, a silica plug may be formed by reaction between sodium silicate and an acid, and a barium sulfate plug may be formed by reaction between a solution of a barium salt and a solution of a sulfate.

In general, any of the well-known techniques and procedures employed for introducing treating agents into wells and forcing them into strata traversed by said wells may be applied in practicing the present invention. It is not usually necessary to locate and isolate the high permeability strata to be treated since the liquids being introduced into the well will automatically seek out and flow through such strata as the paths of least resistance, and there is little tendency for the liquids to enter the oil-bearing sands of low permeability and form a plug therein. Where the permeabilities do not differ widely, however, the more permeable strata may be isolated by means of packing devices and the like and/or the plugging agent may be so selected that it is oil-soluble. If desired, the process may be carried out any number of times within the same formation, i. e., the most highly permeable strata may be plugged by an initial treatment in accordance with the invention, and when further driving operations show evidence of further channelling of the driving fluid through less permeable strata the treatment may be repeated to plug such latter strata.

Other modes of applying the principle of my invention may be employed instead of those explained, change being made as regards the materials or methods employed provided the step or steps stated by any of the following claims, or the equivalent of such stated step or steps, be employed.

I, therefore, particularly point out and distinctly claim as my invention:

1. The method of plugging a subterranean stratum which extends between and communicates with two well bores spaced one from the other, which comprises introducing into the first of said bores a first liquid which is capable of forming a solid body of low permeability upon admixture with a second liquid under the conditions prevailing within said stratum; flowing said first liquid from said first bore through said stratum towards the second of said bores; introducing said second liquid into said second bore; flowing said second liquid from said second bore through said stratum towards said first bore until said second liquid contacts and admixes with said first liquid within said stratum at a point substantially removed from both of said bores; and maintaining said liquids within said stratum until said solid body is formed.

2. The method of claim 1 wherein the said first and second liquids are of such character that the solid body which is formed upon their admixture within the said stratum is soluble in crude oil but insoluble in water.

3. The method of claim 1 wherein said first liquid comprises a polymerizable organic compound and said second liquid comprises a polymerization catalyst therefor.

4. The method of claim 1 wherein the said first liquid comprises an aqueous solution of a soap selected from the class consisting of fatty acid and resin acid soaps and mixtures thereof, and said second liquid comprises an aqueous solution of a heavy metal salt.

5. The method of claim 1 wherein the said first liquid comprises a mixture of organic compounds capable of undergoing condensation to form a solid condensation product, and said second liquid comprises a condensation catalyst therefor.

6. The method of claim 1 wherein the said first liquid comprises an organic compound capable of condensing with a second organic compound under the influence of a condensation catalyst to form a solid condensation product, and the said second liquid comprises said second organic compound and said condensation catalyst.

7. The method of plugging a subterranean stratum which extends between and communicates with two well bores spaced one from the other, said stratum having substantially higher permeability than the formation through which it extends, which method comprises introducing into the first of said bores a first liquid which is capable of forming a solid body of low permeability upon contact with a second liquid under conditions prevailing within said stratum; applying to said first liquid sufficient pressure to force it from said first bore through said stratum towards the second of said bores; introducing said second liquid into said second bore; applying to said second liquid sufficient pressure to force it from said second bore through said stratum towards said input well until said second liquid contacts and admixes with said first liquid within said stratum at a point substantially removed from both of said bores; maintaining said liquids within said stratum until said solid body is formed therein; and thereafter withdrawing excess liquid from said bores.

8. The method of claim 7 wherein the said first and second liquids are of such character that the solid body which forms upon the admixture within said stratum is soluble in crude oil but not in water.

9. The method of claim 7 wherein the said first liquid comprises a polymerizable organic compound and the said second liquid comprises a polymerization catalyst therefor.

10. The method of claim 7 wherein the said first liquid comprises an aqueous solution of a soap selected from the class consisting of fatty acid and resin acid soaps and mixtures thereof, and said second liquid comprises an aqueous solution of a heavy metal salt.

11. The method of claim 7 wherein the said first liquid comprises a mixture of organic compounds capable of undergoing condensation to form a solid condensation product, and said second liquid comprises a condensation catalyst therefor.

12. The method of claim 7 wherein the said first liquid comprises an organic compound capable of condensing with a second organic compound under the influence of a condensation catalyst to form a solid condensation product, and the said second liquid comprises said second organic compound and said condensation catalyst.

13. The method of claim 11 wherein said first liquid comprises an aldehyde and a phenol condensible therewith, and said second liquid comprises a condensation catalyst.

14. The method of claim 12 wherein the said first liquid comprises an aldehyde, and the said second liquid comprises a phenol capable of condensing with said aldehyde to form a solid resin and a condensation catalyst.

15. The method of claim 12 wherein the said first liquid comprises a phenol, and the said second liquid comprises an aldehyde capable of condensing with said phenol to form a solid resin and a condensation catalyst.

16. The method of recovering petroleum from a subterranean formation which is penetrated by an input well and an output well and in which at least one stratum of high permeability with respect to the subsequently employed driving fluid extends between and communicates with said input well and said output well, which comprises introducing into said one input well a first liquid which is capable of forming a solid body of low permeability upon admixture with a second liquid under the conditions prevailing within said stratum; flowing said first liquid from said input well through said stratum towards said output well; introducing said second liquid into said output well; flowing said second liquid from said output well through said stratum towards said input well until said second liquid contacts and admixes with said first liquid within said stratum at a point substantially removed from said input and output wells; maintaining said liquids within said stratum until said solid body is formed; withdrawing excess liquid from said wells; and forcing a driving fluid into said formation from said input well under sufficient pressure to force it through said formation towards said output well.

17. The process of claim 16 wherein the said driving fluid is water.

References Cited in the file of this patent

UNITED STATES PATENTS

| | | |
|---|---|---|
| Re. 21,916 | Vietti | Sept. 20, 1941 |
| 1,421,706 | Van Auken Mills | July 4, 1922 |
| 2,223,933 | Garrison | Dec. 3, 1940 |
| 2,252,271 | Mathis | Aug. 12, 1941 |
| 2,267,855 | Chamberlain | Dec. 30, 1941 |
| 2,272,673 | Kennedy | Feb. 10, 1942 |
| 2,402,588 | Andresen | June 25, 1946 |
| 2,670,048 | Menaul | Feb. 23, 1954 |
| 2,708,974 | Fisher et al. | May 24, 1955 |